W. W. VIRDIN.
PROPELLING LOCOMOTIVE ENGINES ON RAILROADS.
No. 24,679. Patented July 5, 1859.
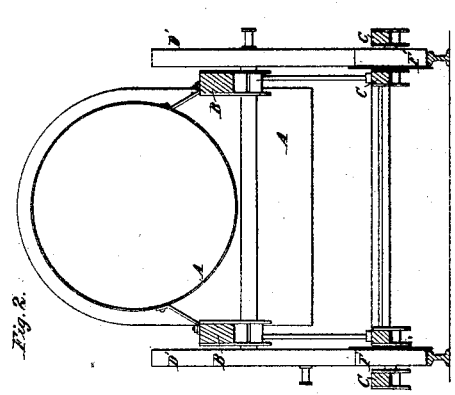
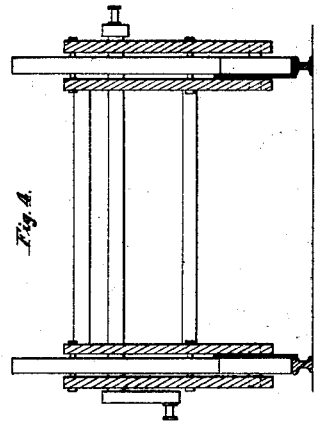
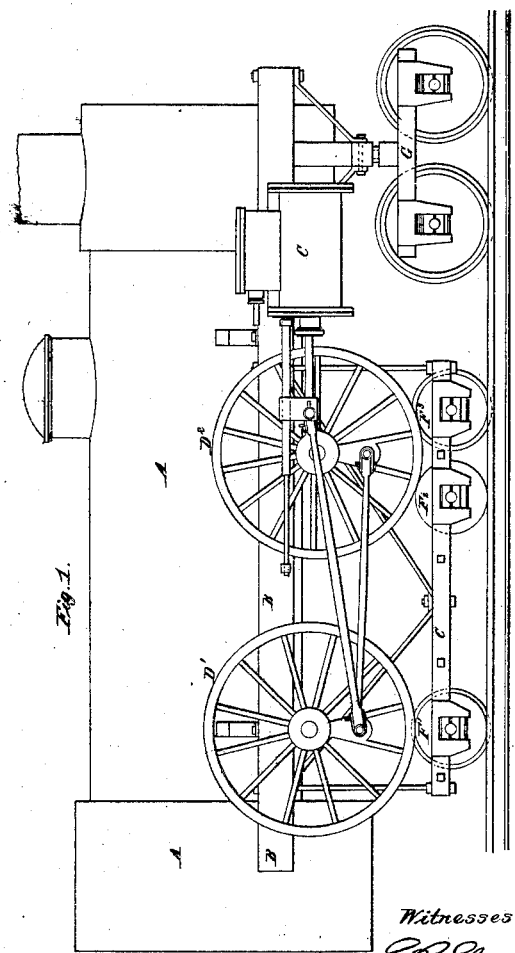
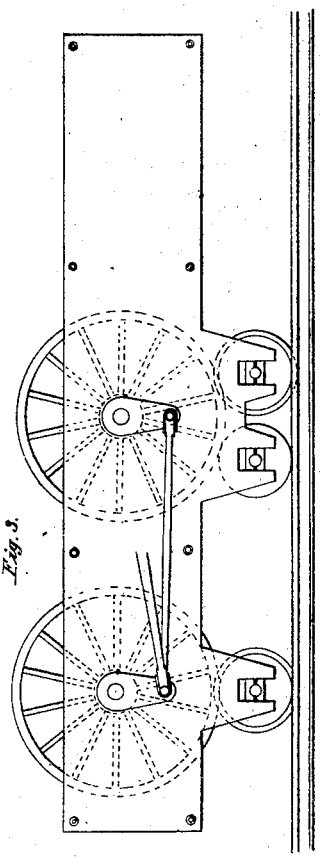

UNITED STATES PATENT OFFICE.

WILLIAM W. VIRDIN, OF BALTIMORE, MARYLAND.

MODE OF PROPELLING LOCOMOTIVE-ENGINES ON RAILROADS.

Specification of Letters Patent No. 24,679, dated July 5, 1859.

*To all whom it may concern:*

Be it known that I, WILLIAM W. VIRDIN, of Baltimore, in the county of Baltimore and State of Maryland, have invented certain new and useful Improvements in the Construction of Locomotives, and hereby declare that the following is a full, clear, and exact description of the construction and operation of the same, reference being had to the accompanying drawings, which make a part of this specification.

The same letters in the different figures denote the same parts.

Figure 1 is a side elevation and Fig. 2 is an end elevation of such portions and an ordinary locomotive with two pair of driving wheels as will enable a clear explanation to be made of the nature of my improvement.

(A) is the frame work of the locomotive.

(D') is one of one pair of the driving wheels and (D²) is one of another pair of the driving wheels.

(F', F², F³) are friction wheels interposed between the driving wheels and the rail.

The manner of rotating the driving wheels is the same as that of ordinary locomotives but instead of the force being exerted on the rail directly from the driving wheels it is transmitted from the driving wheels to the rail by the friction wheels (F' F² F³). The frame (E) acts as a guide to the friction wheels (F' F² F³) and retains them in their places but does not rest or bear down upon their axles. It also receives and transmits the propelling force.

I do not limit myself to any particular size of the friction or driving wheels nor to any proportion that they should bear one to the other but they may be of any size or proportion desired. Nor do I limit myself to any particular number of friction wheels to each driving wheel.

Two opposite friction wheels may be on one axis that extends across the locomotive frame or each friction wheel may have a separate axle as shown on the drawing.

Although the description of the improvement refers merely to its application to locomotives technically so termed yet I do not confine my improvements to such application.

Figs. 3 and 4 represent a side and an end elevation of a frame somewhat different in form from the one above described but the same in effect. The cranks in these figures are attached to the axle of the driving wheels and are outside of the frame. This arrangement corresponds more in form to that of the accompanying drawings. All differences between this form and the one above described will be evident upon inspection and needs no further description. Some of the friction wheels are required to be flanged but others may be used without flanges if preferred as shown in the drawing.

What I claim as my invention and desire to secure by Letters Patent is—

The placing of friction wheels under the driving wheels of locomotives or other vehicles in the manner substantially the same as described in this specification.

W. W. VIRDIN.

Witnesses:
 WM. H. HAYWARD,
 JOHN MARKENHEIMER.